Nov. 12, 1957  O. W. SHELOR ET AL  2,812,665
CORRELATED SPROCKETS AND CHAIN THEREFOR IN WRAPPED RELATION
TO ONE AND RECTILINEAR RELATION TO THE OTHER
Filed May 28, 1956
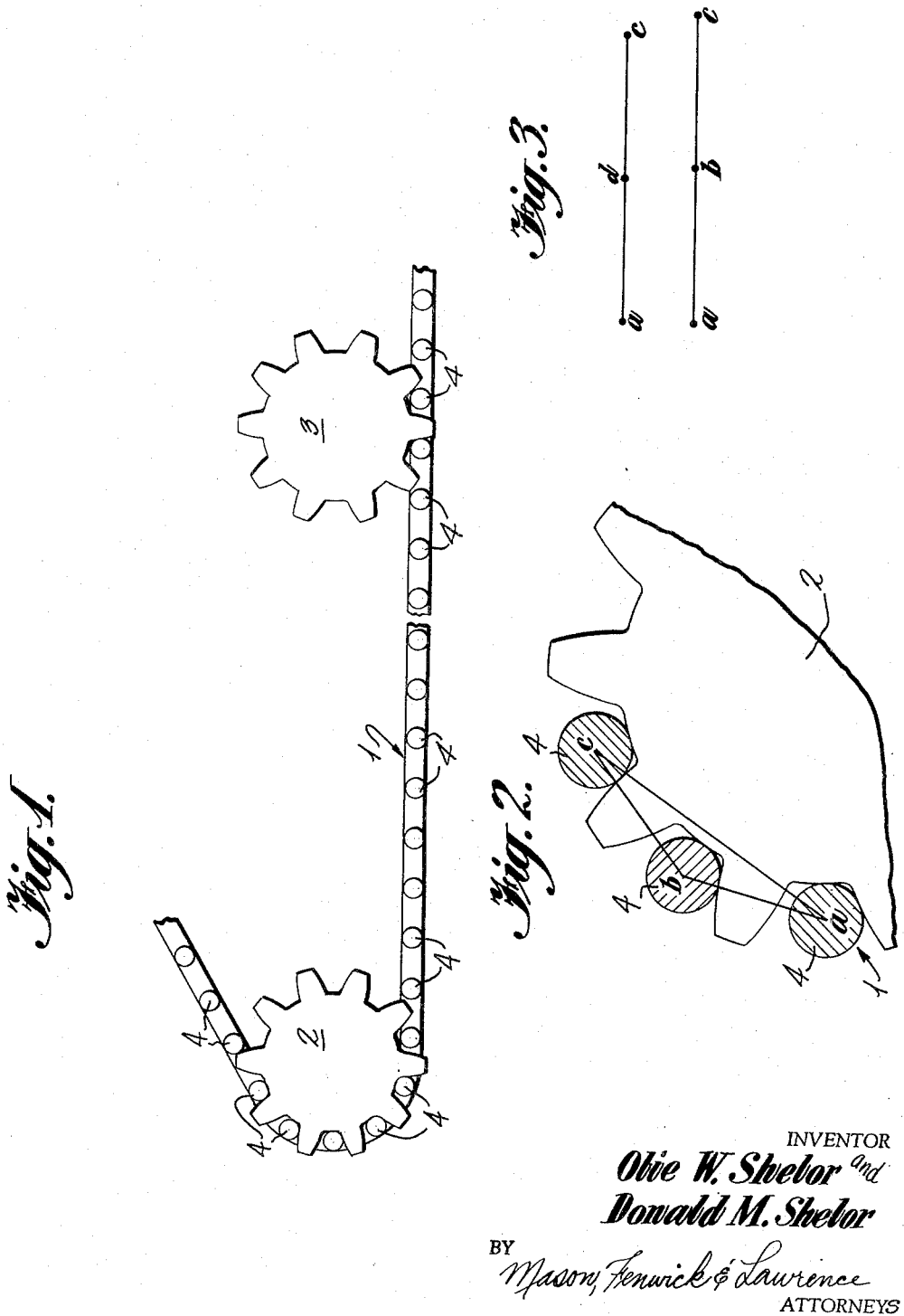
INVENTOR
Olie W. Shelor and
Donald M. Shelor
BY
Mason, Fenwick & Lawrence
ATTORNEYS

United States Patent Office 2,812,665
Patented Nov. 12, 1957

2,812,665

CORRELATED SPROCKETS AND CHAIN THEREFOR IN WRAPPED RELATION TO ONE AND RECTILINEAR RELATION TO THE OTHER

Olie W. Shelor, Salem, Va., and Donald M. Shelor, Seaford, Del., assignors of forty percent to said Olie W. Shelor, twenty percent to said Donald M. Shelor, five percent to Winton W. Shelor, Salem, Va., five percent to Howard J. Shelor, Salem, Va., and thirty percent to Thomas F. Lucas, Roanoke, Va.

Application May 28, 1956, Serial No. 587,555

1 Claim. (Cl. 74—216.5)

This invention relates to machine elements, and particularly to a pair of correlated sprockets that accurately fit respectively the wrapped-around portion of a chain and the straight flight portion of the same chain. At first blush one would be likely to conclude that no problem exists; that two identical sprockets will fit any part of the same chain, but such is not the case as will presently be clearly demonstrated.

The general object of the invention is to provide a machine element comprising a chain and a pair of sprockets therefor, the chain being wrapped with respect to one sprocket and having a rectilinear portion engaged by the other sprocket, the sprockets being designed as to their pitch diameters according to a formula, whereby for any given chain pitch length a pair of sprockets may be designed which are respectively an accurate fit on the wrap-around and straight flight portions of the chain.

Other objects of the invention will appear as the following description of a practical embodiment thereof proceeds.

In the drawing which accompanies and forms a part of the following specification, and throughout the figures of which the same reference characters have been used to denote identical parts:

Figure 1 is a side elevation of a chain and sprocket drive embodying the invention, including a pair of correlated sprockets, one wrapped by the chain, the other engaging a rectilinear flight of the chain, both having pitch diameters which make the sprockets an accurate fit with respect to the parts of the chain with which they are in mesh;

Figure 2 is a side elevation of portions of the drive sprocket, the chain rollers being shown in section, with construction lines diagrammatically illustrating the actual chain link pitch and the effective chain link pitch when wrapped around the sprocket;

Figure 3 is a diagrammatic view showing the construction lines of Figure 2 laid parallel and juxtaposed for facility of comparison.

Before adverting to a description in detail of the invention, it may be stated that although it is common in many machines and apparatus to have a pair of sprockets in which the chain is wrapped about one, and presents a straight flight to the other, very few manufacturers have realized that there is any difference in fit according to the location of the sprockets on the chain, and almost invariably a pair of identical sprockets are furnished or installed.

Almost any handbook on gearing contains formulae for designing a sprocket that will be an accurate fit for a chain of any arc of wrap with respect to said sprocket, but insofar as applicants' knowledge and experience has shown, no one has heretofore worked out a solution for the problem of designing such a pair of sprockets.

Referring now in detail to the drawing, the chain 1 is shown wrapped about the sprocket 2, and having a rectilinear flight engaged by the sprocket 3.

It is readily demonstratable from Figures 2 and 3 of the drawing that the effective pitch length of a chain is not the same where it is wrapped about the sprocket as where it is in straight tangential relation thereto. Figure 2 shows part of the standard sprocket 2, the link rollers 4 indicating the wrapped portion of the chain, the axes of the rollers being at the points $a$, $b$ and $c$. The lines $ab$ and $bc$ represent the actual pitch lengths of adjacent links. The line $ac$ is the rectilinear distance between the alternate roller axes $a$ and $c$, and therefore, one-half of this distance represents the orthographic projection of the actual pitch length of one link in the wrapped region. In Figure 3 the lower line represents the sum of the sides $ab$ and $bc$ of the triangle shown in Figure 2, or twice the actual pitch length, while the upper line is the base of said triangle, representing twice the orthographic projection of the actual pitch length, $d$ being the middle point of said line. It is obvious that the orthographic projection of the actual pitch length of the chain in the arc of the wrap is less than the actual rectilinear pitch length, so that the pitch diameters must be different, of sprockets respectively fitting these parts of a chain.

The result of employing sprockets having the same pitch diameter for the wrapped as well as the straight portion of the chain, as is now customary, is that in operation there is a gain of the links relative to the teeth of the sprocket meshing with the rectilinear portion of the chain, so that the teeth ride partly up the link rollers and then slip back. Where the sprocket engageable with the rectilinear portion is an idler and not heavily loaded, this misfit may pass unnoticed, but it takes its toll in undue wear of both sprocket and chain. However, there are instances, as when the sprocket in mesh with the straight flight carries a load, that the imperfect fit results in such vibration as to become an actual impediment to the practical operation of the machine or apparatus in which it occurs.

For example, the patent to Munroe 1,808,369, granted June 2, 1931, discloses a drying apparatus in which driven rollers carry material through a drier. The rollers are driven by sprockets at their ends meshing with a straight flight of chain, a portion of the chain being wrapped about the driving sprocket. The defect in this machine was that the chain rode up on the teeth of the roller sprockets so that it slipped over the teeth and did not rotate some of the rollers whereby the material was dragged through the drier. Munroe experimented unsuccessfully with various types of sprockets and with blocks to hold the chain forcibly down. He finally hit upon the special sprocket forming the subject of his patent, which has nonradial hooked teeth which pull down the next approacing link into partial wrap-around relation to the special sprocket, as shown in Figure 3 of the patent drawing.

Through our own previous experience, lack of an adequate solution to the problem of designing correlated sprockets with pitch diameters to fit the wrapped and rectilinear portions of the same chain, has been forcefully brought home to one of the members of the present joint inventorship. As manufacturer of a garden tractor of the tread type, the tread chain was made to wrap about the drive sprocket while idler sprockets in mesh with the rectilinear flight of the tread chain supported the weight of the tractor upon the tread. Being at the time unaware that there was any problem of fit attending the two said portions of the chain, he employed identical sprockets for the drive and idlers. The result was violent vibration communicated to the handles of the tractor due to the weighted idlers climbing the link rollers and slipping back. This made the tractor quite impractical, In the interest of improvement, the problem was stated to a large number of sprocket manufacturers, none of whom had anything to offer other than identical sprockets. The said joint inventor then by repeated trial and error devised an idler sprocket with larger pitch diameter than the drive sprocket, and with the teeth made so narrow that they projected loosely into the links without any pretense of fit. This construction is described in the patent to Olie W. Shelor, 2,512,443, granted June 20, 1950. The result of this unscientific attempt was that mud became squeezed up into the links between the ill-fitting teeth and rollers, being compressed by the weight of the tractor body as the chain travelled, forming an obstruction upon which the teeth would still ride and slip back with consequent vibration.

With this unpromising background, applicants set to work reasoning that since the same chain presented to the sprockets different pitch lines in its wrapped and rectilinear portion, this being true of all sizes of chains, there must be some correlation of the pitch diameters of sprockets fitting these respective portions, and as a result of extensive experimentation they came up with this formula:

$$\text{Sprocket pitch diameter} = \frac{C \times \text{chain pitch length}}{\text{sine} \angle A}$$

in which A equals 180° divided by the number of sprocket teeth, and C is a constant, 1.0499 when the formula is applied to the sprocket with which the chain makes tangential contact, and a variable when the formula is applied to the wrapped sprocket, beginning with 1.0499 for zero degree wrap, and decreasing by .0002772 for each degree of wrap up to 180° wrap. For example, to find C for a chain wrap of 20°, multiply .0002772 by 20 equals .00554. This subtracted from 1.0499 equals 1.04436, so that the correlated factors C to be used in the formula respectively for the wrapped and rectilinearly contacted sprockets are 1.04436 and 1.0499.

The correlated pitch diameters of both sprockets for any chain are found by determining the pitch length of the chain, the number of teeth desired for each sprocket, and the arc of wrap to be applied to the wrapped sprocket, and using these known factors in the formula.

Now to give a specific example, assuming that the chain pitch length is .75 inch, the number of teeth to be on the wrapped sprocket is 25, the arc of wrap to be 20° and the number of teeth of the sprocket to mesh with the straight flight of the chain is 18, the calculation for the wrapped sprocket would be:

$$\angle A = 180° \div 25 = 7.2°$$

$$\text{Sine} \angle 7.2° = .12533$$

$$C = 1.0499 - (20 \times .0002772) = 1.04436$$

Substituting known values in the above formula:

$$S.P.D. = \frac{1.04436 \times .75}{.12533} = \frac{.78330}{.12533} = 6.25 \text{ inches}$$

the pitch diameter for the wrapped sprocket.

Calculation for the straight flight sprocket.

$$\angle A = 180° \div 18 = 10°$$

$$\text{Sine} \angle A = .17365$$

$$C = 1.0499$$

Substituting known values in the formula:

$$S.P.D. = \frac{1.0499 \times .75}{.17365} = 4.535 \text{ inches}$$

the pitch diameter for the straight flight sprocket.

To summarize, for a chain of ¾ inch pitch length, a pair of correlated sprockets fitting said chain, the wrap-around sprocket having 25 teeth and the straight flight sprocket 18 teeth, the respective pitch diameters of said sprockets would be 6.25 inches and 4.535 inches.

This formula is universal in its application for all chains and for any selected number of teeth for each sprocket. This invention does not concern itself with the shape of the teeth, which may be variously designed according to well established rules and formulae.

While we have in the above invention described what we believe to be a practical embodiment thereof, it will be understood by those skilled in the art that the descriptive limitations embraced in the specification and drawing are not necessarily limitative in their bearing upon the invention.

What we claim is:

In combination, a chain and pair of correlated sprockets therefor, one being meshed with a rectilinear flight of said chain, the other being in wrapped relation to said chain, the length of the pitch diameters of said respective sprockets being derived from the formula:

$$\text{Sprocket pitch diameter} = \frac{\text{chain pitch length} \times C}{\text{sine} \angle A}$$

in which $\angle A$ is 180° divided by the number of teeth in the sprocket, and C a constant 1.0499 when the formula is applied to the sprocket meshing with the straight flight of the chain, and C is a variable equal to 1.0499 minus .0002772 for each degree wrap from 0° to 180° when the formula is applied to the wrapped sprocket.

References Cited in the file of this patent

UNITED STATES PATENTS

| | | |
|---|---|---|
| 1,808,369 | Munroe | June 2, 1931 |
| 2,667,791 | Bremer | Feb. 2, 1954 |